United States Patent [19]

Mrenna et al.

[11] Patent Number: 5,519,561
[45] Date of Patent: May 21, 1996

[54] CIRCUIT BREAKER USING BIMETAL OF THERMAL-MAGNETIC TRIP TO SENSE CURRENT

[75] Inventors: Stephen A. Mrenna, Brighton Township, Beaver County; David M. Wood, Cranberry Township, Butler County; Raymond W. Mackenzie, Baldwin Boro, all of Pa.

[73] Assignee: Eaton Corporation, Cleveland, Ohio

[21] Appl. No.: 336,391

[22] Filed: Nov. 8, 1994

[51] Int. Cl.⁶ .................................................. H02H 5/04
[52] U.S. Cl. ............................. 361/105; 337/16; 337/108
[58] Field of Search ................................ 361/42, 46–50, 361/93, 99, 103, 105; 337/3, 13, 16, 107–110

[56] References Cited

U.S. PATENT DOCUMENTS

| | | | |
|---|---|---|---|
| 4,081,852 | 3/1978 | Coley et al. | 361/45 |
| 5,224,006 | 6/1993 | MacKenzie et al. | 361/45 |
| 5,420,740 | 5/1995 | MacKenzie et al. | 361/45 |

*Primary Examiner*—Brian K. Young
*Assistant Examiner*—Michael J. Sherry
*Attorney, Agent, or Firm*—Martin J. Moran

[57] ABSTRACT

In a circuit breaker having a thermal-magnetic trip, the voltage across the bimetal is used to sense load currents. This voltage signal representative of current through the bimetal can be used as an input to an arcing fault detector. The signal is converted to a bandwidth limited di/dt signal. If the magnitude of the di/dt signal exceeds a threshold indicative of the onset of an arc a predetermined number of times within a given interval, the circuit breaker is tripped. The voltage across the bimetal can also be used in other devices requiring a measure of load current such as, for example, a meter or an overcurrent alarm.

9 Claims, 2 Drawing Sheets

CIRCUIT BREAKER USING BIMETAL OF THERMAL-MAGNETIC TRIP TO SENSE CURRENT

BACKGROUND OF THE INVENTION

1. Field of the Invention

This invention relates to circuit breakers having a thermal-magnetic trip mechanism, and in particular to such a circuit breaker which utilizes the bimetal of the thermal-magnetic trip mechanism for sensing current, such as for example, for an arcing fault detector, a meter or an overcurrent alarm.

2. Background Information

It has been observed that arcing type faults in a power distribution system typically do not trip the conventional circuit breaker. An arcing fault can be caused by bared conductors which intermittently touch and then separate due to magnetic forces generated by the fault current. Thus, the arcing fault is characterized by repetitive step increases in current. Such faults have a high resistance, and being intermittent they draw limited current and therefore do not trip the conventional circuit breaker. However, they can start a fire if combustible material is present.

If the settings of the conventional trip unit are lowered so that they trip in response to an arcing fault, an unacceptable number of nuisance trips can be induced by a number of common loads which generate a similar current step function.

A great deal of effort has been directed toward developing a circuit breaker which can respond to arcing faults in a power distribution system but be immune to nuisance tripping. One approach has been to analyze the current waveform produced by the arcs to identify unique arc characteristics. However, such detectors tend to be expensive, especially for the miniature circuit breakers typically used in residential and light commercial applications.

Commonly owned U.S. Pat. No. 5,224,006 discloses a circuit breaker which utilizes a bandwidth limited di/dt signal to detect arcing faults. The di/dt signal is generated by a sensing coil shared with a dormant oscillator type ground fault detector. Pending U.S. application Ser. No. 08/023,435 filed on Feb. 26, 1993, improves discrimination of arcing faults from current transients caused by commonly encountered loads by recognizing that such transients caused by the loads are typically singular events while the arcing fault is repetitive. Hence, this patent application discloses an arcing fault circuit breaker which only trips upon detection of two step increases in current within about a second. This patent application also suggests that as an alternative to the use of a detector coil to generate the di/dt signal, the resistance across a section of wire carrying the load current can be used to measure the current. In order to generate a signal of sufficient magnitude in a reasonable length of wire, the gauge of the wire had to be reduced. However, the smaller gauge wire was not able to sustain typical short circuit currents.

A typical thermal-magnetic circuit breaker has a bimetal which heats up and bends to unlatch a spring operated trip mechanism in response to sustained overcurrents. The magnetic trip is provided by an armature which is a magnetically attracted by current flowing through the bimetal to unlatch the trip mechanism in response to short circuit currents.

At present there is no simple way of determining the current flowing through a circuit breaker with a thermal-magnetic trip. It would be useful to be able to easily measure this current, either just to provide an accurate determination of the load current, or for use in devices responsive to current, such as for example, an arcing fault detector or an overload alarm.

There is a need for an improved circuit breaker with a thermal-magnetic trip device having a simple, inexpensive arrangement for determining current passing through the circuit breaker.

There is also a need for an improved circuit breaker providing protection against arcing faults which is reliable and inexpensive.

There is a further need for such an improved circuit breaker which does not require a coil to generate a di/dt signal for use in detecting arcing faults, yet can withstand typical short circuit currents.

There is a further need for such a circuit breaker in which the arcing fault detector requires a minimum of space.

SUMMARY OF THE INVENTION

These needs and others are satisfied by the invention which is directed to a circuit breaker having a trip mechanism including a bimetal connected at opposite ends in series with an ac electrical system for tripping separable contacts open in response to current in the electrical system flowing through the bimetal of predetermined magnitude/time characteristics, and response means connected to the opposite ends of the bimetal for responding to a voltage across the bimetal representative of the current in the electrical system flowing through the bimetal. The response means can include devices such as, for example, a meter calibrated to read the current flowing through the bimetal, a device which generates an auxiliary signal when a selected current condition is reached, or an arcing fault detector which trips the breaker.

In another respect, the invention is directed to a circuit breaker for protecting an electrical system from both overcurrents and arcing faults in which the arcing fault detector includes means sensing the voltage across the bimetal of the overcurrent detector and arc responsive means actuating a trip mechanism in response to predetermined conditions of the voltage across the bimetal which are indicative of an arcing fault. In particular, the arc responsive means includes means detecting step increases in the voltage across, and therefore current through, the bimetal and means actuating the trip mechanism in response to a predetermined number of step increases in the voltage across the bimetal in a given time interval. Preferably the means detecting the step increases in the voltage across the bimetal is a band pass filter which generates a bandwidth limited di/dt signal which is compared to a threshold value. A counter counts each time the magnitude of the bandwidth limited di/dt signal exceeds the threshold and a trip signal is generated when a predetermined count is reached. Preferably, the trip signal is generated when the count reaches two within about a one second interval.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a miniature circuit breaker such as that described in U.S. Pat. No. 4,081,852 which is hereby incorporated by reference. That circuit breaker incorporates a thermal magnetic-trip device comprising a bimetal and a magnetic armature which unlatch a spring driven mechanism which opens the contacts in response to a persistent overcurrent and a short circuit current, respectively. The circuit breaker of U.S. Pat. No. 4,081,852 includes a ground fault detector which can be replaced by or be used in addition to the arcing fault detector which can be used in the present invention.

Figure 1:
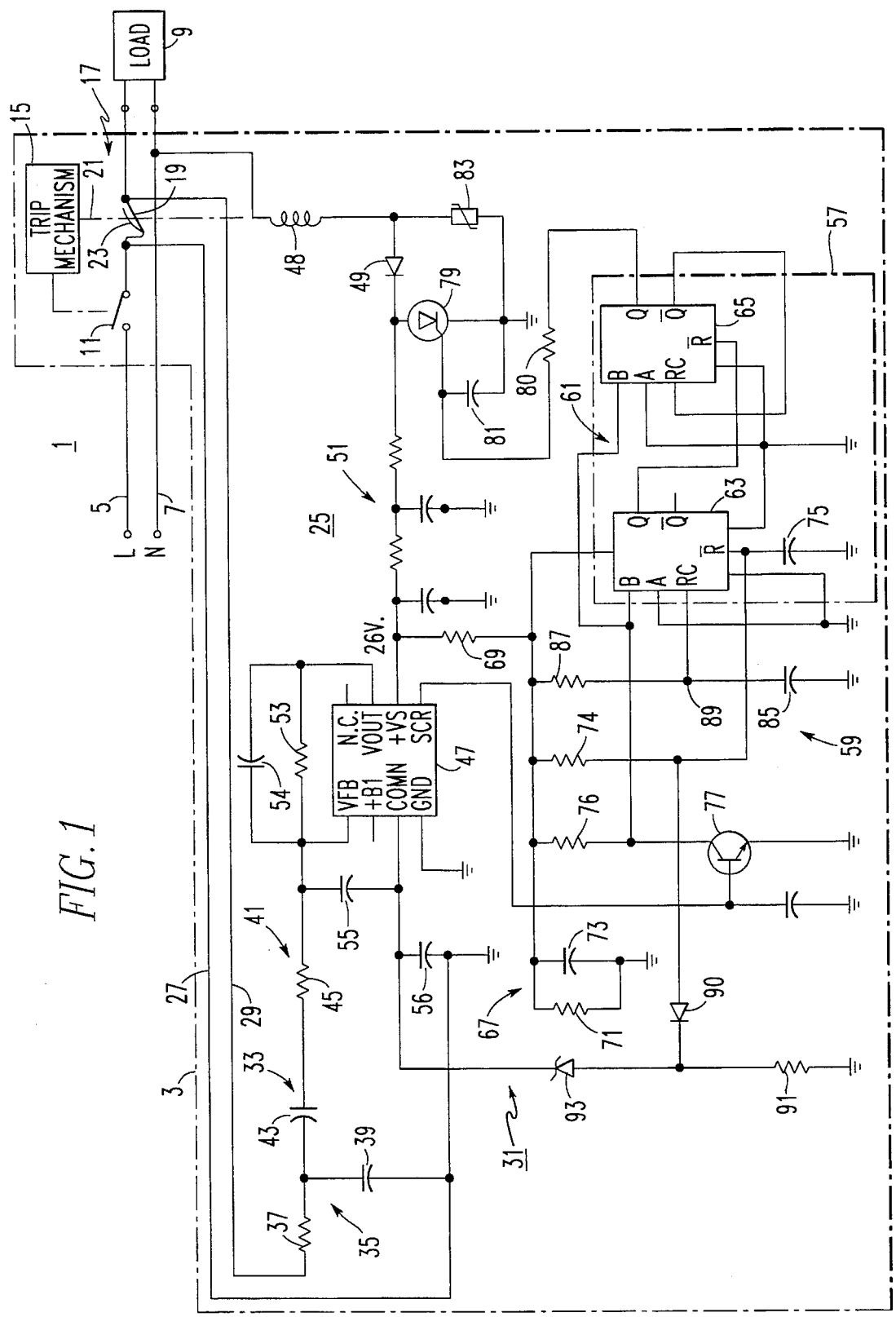
FIG. 1 is a schematic diagram of a circuit breaker in accordance with the invention.

Turning to FIG. 1, the electrical system 1 protected by the circuit breaker 3 includes a line conductor 5 and a neutral conductor 7 connected to provide power to a load 9. The circuit breaker 3 includes separable contacts 11 which can be tripped open by a spring operated trip mechanism 15. The trip mechanism may be actuated by a conventional thermal-magnetic overcurrent detector 17. The thermalmagnetic overcurrent detector 17 includes a bimetal 19 connected in series with the line conductor 5. Persistent overcurrents heat up the bimetal 19 causing it to bend and release a latch 21 which actuates the trip mechanism 15. Short circuit currents through the bimetal 19 magnetically attract an armature 23 which alternatively releases the latch 21 to actuate the tip mechanism.

In addition to the thermal-magnetic overcurrent detector 17 which provides conventional protection, the circuit breaker 3 includes an arcing fault detector 25. This arcing fault detector includes a pair of leads 27 and 29 connected to sense the voltage across the bimetal 19. As the resistance of the bimetal 19 is known (for the exemplary bimetal, about 0.0025 ohms), this voltage is a measure of current flowing through the line conductor 5. The remainder of the arcing fault detector 25 comprises arc responsive circuit 31. This arc responsive circuit distinguishes step increases in the current through the conductor 5 indicative of arcing faults from transients caused by various loads such as thermostats in an appliance, dimmer switches and the like. To this end, the circuit 31 includes a band pass filter 33 having a low pass filter 35 formed by the resistor 37 and shunt capacitor 39, and a high pass filter 41 made up of the capacitor 43 and resistor 45. The band pass filter 33 produces a bandwidth limited di/dt signal which is applied to a window comparator implemented on an integrated circuit chip 47. A similar window comparator is disclosed in U.S. Pat. No. 5,224,006 which is hereby incorporated by reference. The chip 47 is powered by current drawn from the line conductor 5 through a solenoid 48 and a diode 49. This half wave current is filtered by a filter 51 to generate the 26 volt supply for the chip 47. When the bandwidth limited di/dt signal produced by the band pass filter 33 exceeds a positive threshold on positive half cycles or a negative threshold on negative half cycles, the SCR output of the chip 47 goes high. The gain of the amplifier of the chip 47 is set by the feedback resistor 53 and noise immunity is provided by the capacitor 54. Additional noise immunity is provided by the capacitor 55. The capacitor 56 bypasses ac signals on the COMN lead which is at one-half the supply voltage.

As mentioned, the arcing fault detector 25 further discriminates arcing faults from other types of disturbances in the electrical circuit 1 by counting the number of times that the bandwidth limited di/dt signal exceeds the thresholds within a given time interval. More specifically, the arc responsive circuit 31 generates a trip signal if the bandwidth limited di/dt signal exceeds the threshold twice within about one second. In order to perform this function, the circuit 31 includes a counter 57 and a timer 59 to time the interval. The counter 57 comprises a CMOS dual multivibrator 61 having one-half 63 configured as a MONOSTABLE and the other half 65 configured as a latch. The dual multivibrator 61 is powered from the 26 volt supply for the chip 47 by a five volt supply 67 generated by the voltage divider formed by resistors 69 and 71, and the capacitor 73. This five volt supply also releases the reset on the bistable 63 through the inverse reset input $\bar{R}$ when the circuit is energized, with a momentary delay provided by the capacitor 75 and resistor 74 to allow the circuit to stabilize. With the bistable 63 reset, its Q output is low to hold the latch 65 in the reset condition.

In the absence of an arcing fault, a pull-up resistor 76 holds the B trigger of bistable 63 at 5 volts. When the bandwidth limited di/dt signal exceeds either the positive or negative threshold and the SCR output of the chip 47 goes high, a level shifting transistor 77 is turned on. This pulls down the B trigger of the monostable 63 causing the Q output to go high. This in turn releases the reset on the latch 65. However, as the latch 65 is responsive to the negative going edges of pulses applied to its B trigger and the latch 67 was still in reset at the time the transistor 75 was turned on to cause such a pulse edge, the latch 67 does not respond to the first step increase in current detected by the window comparator in the IC 47. However, the second time that the bandwidth limited di/dt signal exceeds a threshold and the SCR output of the chip 47 goes high, the leading edge of the pulse created by turn-on of the transistor 77 toggles the latch 65. This causes the Q output of the latch 65 to go high to turn on an SCR 79. Turn on of the SCR 79 energizes the solenoid 48. This in turn unlatches the latch 21 to actuate the trip mechanism 15 and open the contacts 11. While current continually passes through the diode 49 to provide power to the circuit 31, this current is insufficient to actuate the solenoid 48. However with the SCR 79 turned on sufficient current passes through the solenoid 48 to actuate it. The latch 65 continues to energize the gate of the SCR 79 so that it is fired on successive half cycles of the half wave current drawn from the line conductor until the contacts 11 open. The gate signal from the latch is applied through the resistor 80. The capacitor 81 protects the SCR from noise. The SCR 79 is also protected by the metal oxide varistor 83.

The timer 59 comprises a capacitor 85 charged by the 5 volt power supply through the resistor 87. The node 89 between the capacitor 85 and resistor 87 is connected to the RC input of the monostable 63. When the first pulse is applied to the B trigger of the bistable 63, the capacitor 85 is discharged through an internal resistance connected to the RC input, and then the capacitor 85 begins to charge again. When the voltage on the capacitor 85 reaches a high threshold value, the monostable 63 is reset so that the Q output goes to 0 to reset the latch 65. If this occurs before detection of a second step increase in load current, the counter is reset. As mentioned above, the interval in the exemplary circuit is set to about one second. Hence, the band pass limited di/dt signal must exceed the threshold set by the window comparator on the chip 47 twice within the one second interval in order to generate a trip. These parameters are selected to distinguish the repetitive arcing fault from singular events such as switching of a thermostat and other such load responses. The interval is not made longer to minimize the risk that two such non-arcing events could generate a trip.

In order to preclude transients during start-up from being counted by the counter 57, the capacitor 75 is discharged through a diode 90 and resistor 91 when power is removed from the circuit 31. When power is restored and the voltage generated by the power supply approaches its operating value, a zener diode 93 passes current through the resistor 91 to back bias the diode 90 and permit the capacitor 75 to charge, thereby removing the reset from the monostable 63. The monostable is also reset when the power supply voltage drops to a value (about 13 volts in the exemplary circuit) at which the diode 90 is no longer back biased.

Figure 2:
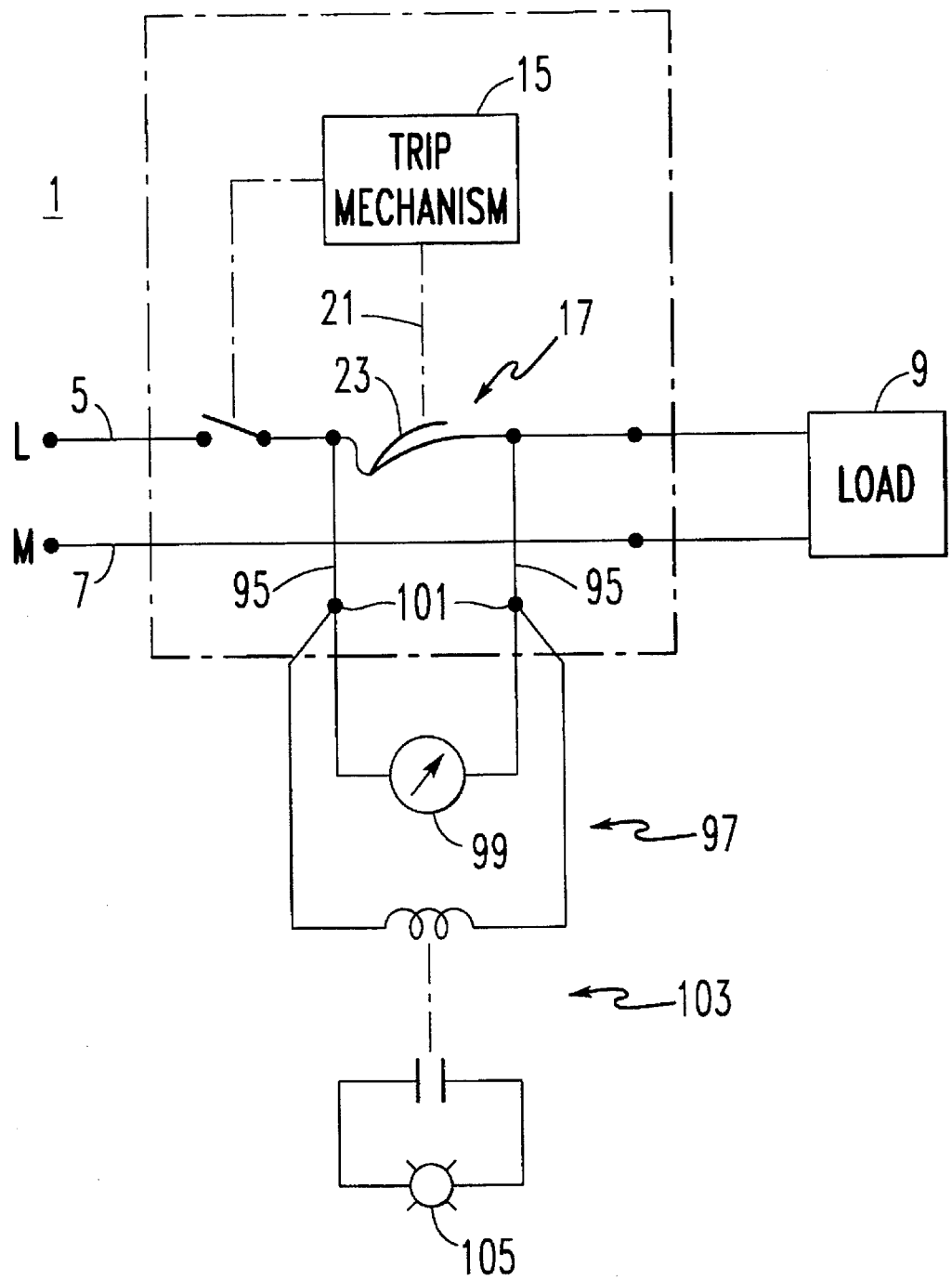
FIG. 2 is a schematic diagram of another embodiment of the invention.

As shown in FIG. 2, the voltage across the bimetal 19, which is representative of load current, can be tapped by leads 95 for use by other response devices 97. Examples of response devices include a meter 99 providing a measure of the load current. The meter 99 need not be a part of the circuit breaker 3. Instead the circuit breaker need only have a pair of terminals 101 to which an external meter may be temporarily or permanently connected. Other types of response devices include an alarm comprising a relay 103 and a light 105 which would signal an overcurrent condition that, if permitted to persist, could result in a trip. Again, a response device in a form of an alarm could be either incorporated in the circuit breaker 3 or provided external to the circuit breaker and connected through the terminals 101.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker for protecting an ac electrical system from overcurrents and arcing faults comprising:

separable contacts connected in series with said electrical system;

a trip mechanism opening said separable contacts when actuated;

an overcurrent detector including a bimetal responsive to selected overcurrent conditions in said electrical system for actuating said trip mechanism; and an arcing fault detector comprising means for sensing voltage across said bimetal representative of current flowing through the bimetal, and arc responsive means actuating said trip mechanism in response to predetermined conditions of said current indicative of an arcing fault.

2. The circuit breaker of claim 1 wherein said arc responsive means includes means detecting step increases in said current represented by said voltage across said bimetal, and trigger means actuating said trip mechanism in response to a predetermined number of step increases in said current represented by said voltage across said bimetal in a given time interval.

3. The circuit breaker of claim 2 wherein said means detecting step increases in said current represented by said voltage across said bimetal comprises band pass filter means generating a bandwidth limited di/dt signal and means comparing a magnitude of said bandwidth limited di/dt signal to a selected threshold, and wherein said trigger means comprises counting means incrementing a count each time the magnitude of said bandwidth limited di/dt signal exceeds said threshold, means generating an actuation signal which actuates said trip mechanism when said count reaches said predetermined number, and means repetitively initiating timing of said given interval on a first count of said counting means and resetting said counting means at the end of said given interval.

4. The circuit breaker of claim 3 wherein said predetermined number is 2 and said given interval is about one second.

5. The circuit breaker of claim 3 wherein said trigger means includes a power supply generating a supply voltage for operating said trigger means and means resetting said counting means when said supply voltage is below a predetermined value.

6. A circuit breaker for protecting an electrical system comprising:

separable contacts connected in series with said electrical system;

a trip mechanism opening said separable contacts when actuated;

an overcurrent detector including a bimetal responsive to selected overcurrent conditions in said electrical system for actuating said trip mechanism; and response means comprising means sensing voltage across said bimetal representative of current flowing through said bimetal and means responsive to said voltage.

7. The circuit breaker of claim 6 wherein said means responsive to said voltage across said bimetal representative of current through the bimetal comprises arc response means actuating said trip mechanism in response to predetermined conditions of said current indicative of an arcing fault.

8. The circuit breaker of claim 6 wherein said means responsive to said voltage across said bimetal representative of current through the bimetal comprises a meter providing an indication of a magnitude of said current.

9. The circuit breaker of claim 6 wherein said means responsive to said voltage across said bimetal representative of current through the bimetal comprises overcurrent indicating means.

* * * * *